US009892855B2

(12) United States Patent
Ando et al.

(10) Patent No.: US 9,892,855 B2
(45) Date of Patent: Feb. 13, 2018

(54) ELECTRONIC COMPONENT

(71) Applicant: TDK CORPORATION, Tokyo (JP)

(72) Inventors: Norihisa Ando, Tokyo (JP); Atsushi Takeda, Nikaho (JP); Hideki Kaneko, Tokyo (JP); Yui Sugiura, Tokyo (JP); Tatsuo Inagaki, Tokyo (JP); Tomomichi Gunji, Tokyo (JP); Kouhei Yamaguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 9 days.

(21) Appl. No.: 15/275,953

(22) Filed: Sep. 26, 2016

(65) Prior Publication Data
US 2017/0098505 A1   Apr. 6, 2017

(30) Foreign Application Priority Data

Oct. 6, 2015 (JP) .................................. 2015-198330

(51) Int. Cl.
| | |
|---|---|
| *H01G 4/30* | (2006.01) |
| *H01G 4/005* | (2006.01) |
| *H01G 4/232* | (2006.01) |
| *H01G 4/248* | (2006.01) |
| *H01G 4/12* | (2006.01) |

(52) U.S. Cl.
CPC .............. *H01G 4/30* (2013.01); *H01G 4/005* (2013.01); *H01G 4/232* (2013.01); *H01G 4/2325* (2013.01); *H01G 4/248* (2013.01); *H01G 4/12* (2013.01)

(58) Field of Classification Search
CPC .......... H01G 4/30; H01G 4/005; H01G 4/232; H01G 4/2325; H01G 4/248; H01G 4/12
See application file for complete search history.

(56) References Cited

U.S. PATENT DOCUMENTS

| | | | |
|---|---|---|---|
| 6,292,353 B1 * | 9/2001 | Haratani ................ | H01G 4/232 361/306.3 |
| 9,087,643 B1 * | 7/2015 | Nishibayashi ......... | H01G 4/005 |
| 9,805,870 B2 * | 10/2017 | Ito ........................... | H01G 4/30 |
| 2008/0073108 A1 | 3/2008 | Saito et al. | |
| 2009/0002920 A1 * | 1/2009 | Itamura .................. | H01G 4/232 361/321.3 |
| 2010/0202098 A1 * | 8/2010 | Yanagida ............... | H01G 4/232 361/305 |

(Continued)

FOREIGN PATENT DOCUMENTS

JP       2008-085280 A     4/2008

*Primary Examiner* — Dion R Ferguson
(74) *Attorney, Agent, or Firm* — Oliff PLC (57) ABSTRACT

An external electrode includes a sintered metal layer disposed on at least an end surface and a conductive resin layer disposed on the sintered metal layer. The sintered metal layer includes a first portion, a second portion, and a third portion. The first portion is disposed at a central region of the end surface. The second portion is disposed at a part of a peripheral region of the end surface, and extends to an edge portion of the end surface from the first portion. The third portion is disposed at a remaining part of the peripheral region of the end surface. The thickness of the second portion is less than that of the first portion. The thickness of the third portion is less than that of the second portion. The first portion, the second portion, and the third portion are covered with the conductive resin layer.

6 Claims, 9 Drawing Sheets

(56) References Cited

U.S. PATENT DOCUMENTS

| | | | | |
|---|---|---|---|---|
| 2012/0007709 A1* | 1/2012 | Taniguchi | ............... | H01G 4/005 336/200 |
| 2012/0019982 A1* | 1/2012 | Sasaki | .................... | H01G 4/002 361/321.1 |
| 2012/0313489 A1* | 12/2012 | Shirakawa | ............... | H01G 4/30 310/365 |
| 2014/0085770 A1* | 3/2014 | Park | ..................... | H01G 4/30 361/305 |
| 2016/0005539 A1* | 1/2016 | Lee | ..................... | H01G 2/065 174/260 |
| 2016/0351332 A1* | 12/2016 | Lee | ..................... | H01G 4/30 |
| 2017/0076864 A1* | 3/2017 | Okai | ..................... | H01G 4/30 |
| 2017/0076867 A1* | 3/2017 | Okai | ..................... | H01G 4/30 |

* cited by examiner

ELECTRONIC COMPONENT

TECHNICAL FIELD

The present invention relates to an electronic component.

BACKGROUND

Known electronic components include an element body having a pair of end surfaces opposing each other, an external electrode disposed on at least the end surfaces, and an internal conductor disposed in the element body and connected to the external electrode (see, for example, Japanese Unexamined Patent Publication No. 2008-85280). In the electronic component described in Japanese Unexamined Patent Publication No. 2008-85280, the external electrode includes a sintered metal layer disposed on at least the end surface and a conductive resin layer disposed on the sintered metal layer.

SUMMARY

An object of an aspect of the present invention is to provide an electronic component in which fixing strength between an element body and an external electrode is improved, electrical contact between an internal conductor and the sintered metal layer is maintained, and stress by a sintered metal layer is relaxed.

An electronic component according to one aspect of the present invention includes an element body having a pair of end surfaces opposing each other, an external electrode disposed on at least the end surface, and an internal conductor disposed in the element body and connected to the external electrode. The internal conductor includes an end portion exposed to the end surface. The external electrode includes a sintered metal layer disposed on at least the end surface and a conductive resin layer disposed on the sintered metal layer. The sintered metal layer includes a first portion, a second portion, and a third portion. The first portion is disposed at a central region of the end surface. The second portion is disposed at a part of a peripheral region of the end surface, and extends to an edge portion of the end surface from the first portion. The third portion is disposed at a remaining part of the peripheral region of the end surface. The thickness of the second portion is less than that of the first portion. The thickness of the third portion is less than that of the second portion. The first portion, the second portion, and the third portion are covered with the conductive resin layer.

The electronic component including the external electrode is mounted by soldering, for example, to another electronic device (e.g., a circuit board, an electronic component, or the like). A solder fillet is formed on the external electrode by solidification of molten solder. Stress is generated in the solder fillet when the molten solder is solidified. In the electronic component according to the above-described one aspect, the external electrode includes the conductive resin layer, and therefore the stress by the solder fillet is relaxed by the conductive resin layer.

The stress by the solder fillet more strongly acts on a central electrode portion of the external electrode corresponding to the central region of the end surface, than on a peripheral electrode portion of the external electrode corresponding to the peripheral region of the end surface. In other words, the stress acting on the central electrode portion of the external electrode is greater than the stress acting on the peripheral electrode portion of the external electrode. In the electronic component according to the above-described one aspect, the thickness of the first portion is greater than that of the second portion, and the thickness of the first portion is greater than that of the third portion, As a result, fixing strength between the element body and the sintered metal layer is improved in the electronic component according to the above-described one aspect, in comparison with, for example, an electronic component in which the thickness of the sintered metal layer is the thickness of the second portion or that of the third portion throughout the sintered metal layer. Therefore, fixing strength between the element body and the external electrode is improved.

In the electronic component according to the above-described one aspect, since the second portion disposed at a part of the peripheral region of the end surface extends to the edge portion of the end surface from the first portion, connectability between the end portion of the internal conductor and the second portion is secured. The thickness of the second portion is greater than that of the third portion. Consequently, the connectability between the end portion of the internal conductor and the second portion is further secured in the electronic component according to the above-described one aspect, in comparison with, for example, an electronic component in which the thickness of the second portion is less than or equal to that of the third portion. As a result, electrical connection between the internal conductor and the sintered metal layer is securely maintained.

When the sintered metal layer is formed on the element body, stress may be generated in the element body. The stress generated in the element body increases as the thickness of the sintered metal layer increases. In the electronic component according to the above-described one aspect, since the thickness of the third portion is less than that of the second portion, the stress by the sintered metal layer is relaxed in comparison with, for example, an electronic component in which the thickness of the third portion is greater than or equal to that of the second portion.

The remaining part of the peripheral region of the end surface may include a region exposed from the third portion. In this case, the region exposed from the third portion may be covered with the conductive resin layer. In the electronic component of this embodiment, the stress by the sintered metal layer is further relaxed. Since the sintered metal layer includes the first portion and the second portion, the electrical connection between the internal conductor and the sintered metal layer is maintained even when the remaining part of the peripheral region of the end surface includes the region exposed from the third portion, in other words, a region where the third portion is not formed.

The second portion and the end portion of the internal conductor may intersect, viewing from a direction perpendicular to the end surface. In this case, even when the electronic component includes a plurality of internal conductors, connectability between the end portions of all the internal conductors and the second portion is secured.

The end surface may have a rectangular shape, and the second portion may extend to a corner portion of the end surface. In this case, even when the electronic component includes a plurality of internal conductors, connectability between the end portions of all the internal conductors and the second portion is secured.

The thickness of the conductive resin layer located on the central region of the end surface may be greater than that of the conductive resin layer located on the peripheral region of the end surface. In this case, the stress by the solder fillet is sufficiently relaxed.

The stress acting on the peripheral electrode portion of the external electrode is less than the stress acting on the central electrode portion of the external electrode. Therefore, it is possible to make the thickness of the conductive resin layer located on the peripheral region of the end surface less than that of the conductive resin layer located on the central region of the end surface in a manner corresponding to the peripheral electrode portion of the external electrode of which the stress acting thereon is less than that of the central electrode portion of the external electrode. In a case where the thickness of the conductive resin layer located on the peripheral region of the end surface is less than that of the conductive resin layer located on the central region of the end surface, an amount of the conductive resin can be reduced in the electronic component of this embodiment, in comparison with, for example, an electronic component in which the thickness of the conductive resin layer is the thickness of the conductive resin layer located on the peripheral region of the end surface throughout the conductive resin layer.

The external electrode may further include a plating layer disposed on the conductive resin layer. In this case, the electronic component of this embodiment is securely mounted by soldering on an electronic device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Hereinbelow, an embodiment of the present invention will be described in detail with reference to the accompanying drawings. In the description, the same components or components having the same function will be denoted by the same reference sign, and a repetitive description thereof will be omitted.

Figure 1:
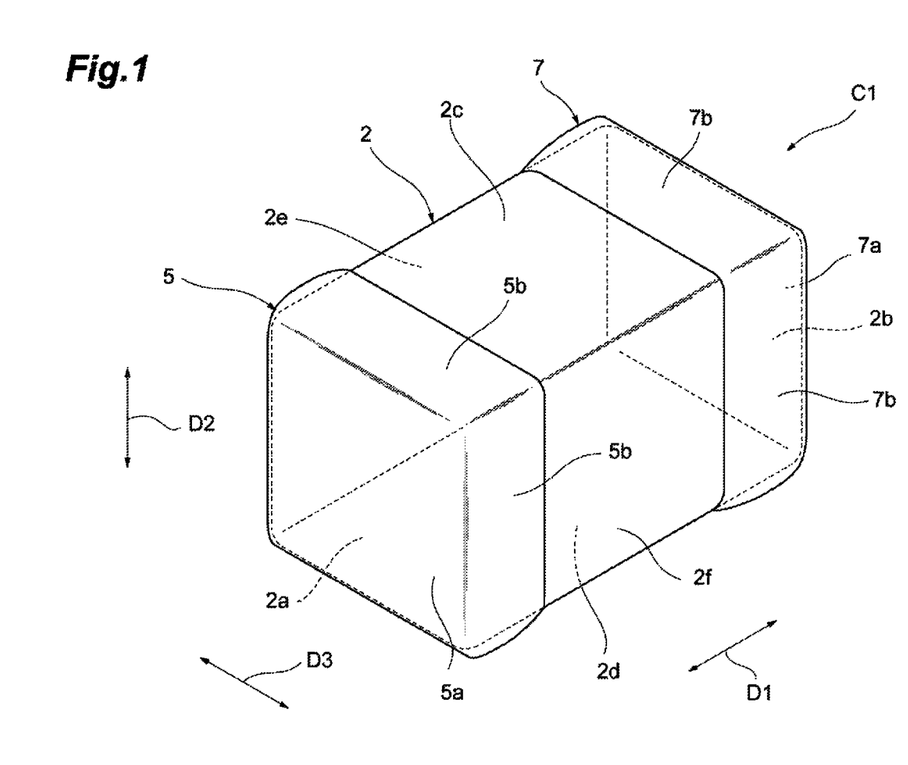
FIG. 1 is a perspective view illustrating a multilayer capacitor according to an embodiment.
Figure 2:
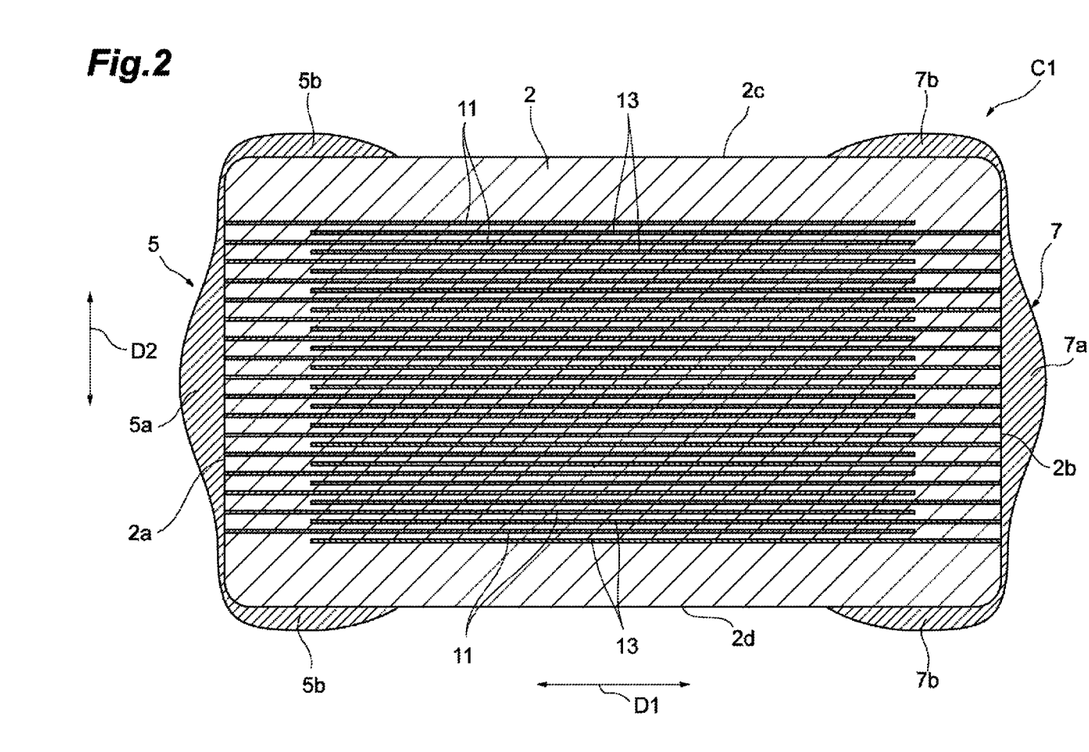
FIG. 2 is a view for explaining a sectional configuration of the multilayer capacitor according to the embodiment.
Figure 3:
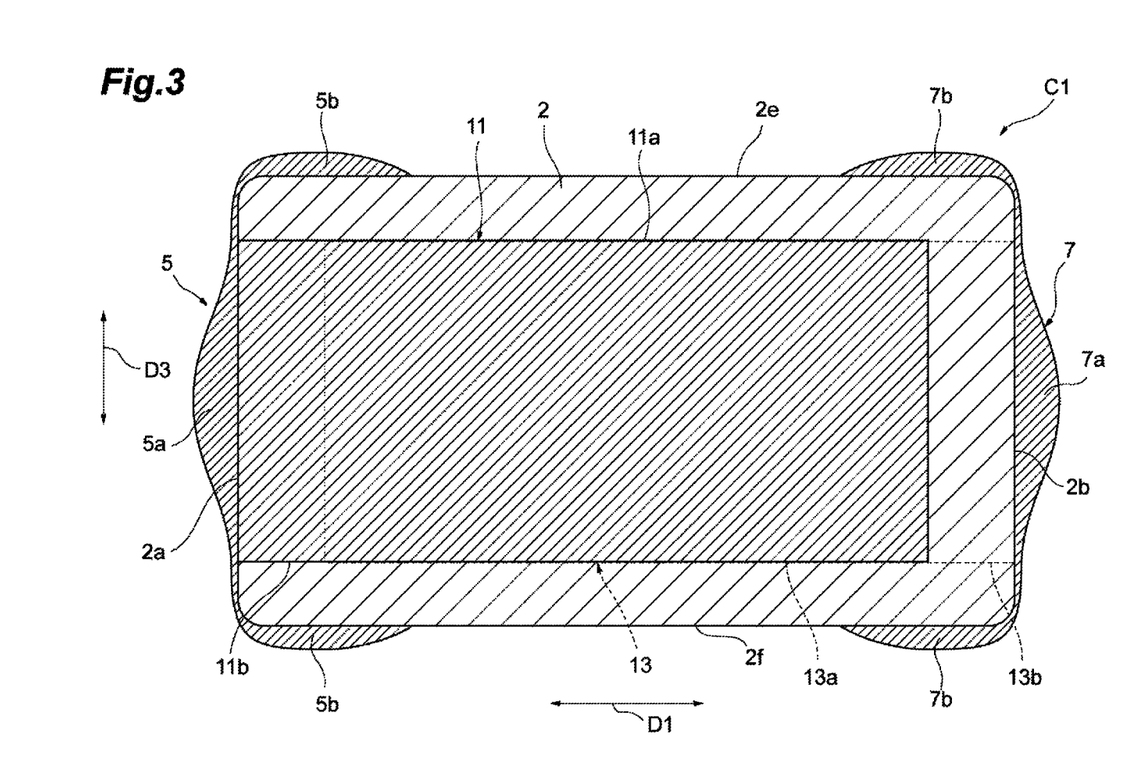
FIG. 3 is a view for explaining a sectional configuration of the multilayer capacitor according to the embodiment.

With reference to FIGS. 1 and 2, a configuration of a multilayer capacitor C1 according to the embodiment will be described. FIG. 1 is a perspective view illustrating the multilayer capacitor according to the embodiment. FIGS. 2 and 3 are views for explaining sectional configurations of the multilayer capacitor according to the embodiment. In the embodiment, a description will be given using the multilayer capacitor C1 as an example of an electronic component.

As illustrated in FIG. 1, the multilayer capacitor C1 includes an element body 2 and external electrodes 5 and 7. The element body 2 has a rectangular parallelepiped shape. The external electrodes 5 and 7 are disposed on an outer surface of the element body 2. The external electrodes 5 and 7 are separated from each other. The rectangular parallelepiped shape includes a shape of a rectangular parallelepiped in which corner portions and ridge portions are chamfered, and a shape of a rectangular parallelepiped in which corner portions and ridge portions are rounded. The external electrodes 5, 7 are also terminal electrodes.

The element body 2 includes, as the outer surface thereof, a pair of end surfaces 2a, 2b opposing each other, a pair of first side surfaces 2c, 2d opposing each other, and a pair of second side surfaces 2e, 2f opposing each other. In the embodiment, a direction (first direction D1) in which the pair of end surfaces 2a, 2b oppose each other is a longitudinal direction of the element body 2, a direction (second direction D2) in which the pair of first side surfaces 2c, 2d oppose each other is a height direction of the element body 2, and a direction (third direction D3) in which the pair of second side surfaces 2e, 2f oppose each other is a width direction of the element body 2.

The length of the element body 2 in the first direction D1 is greater than the length of the element body 2 in the second direction D2 and the length of the element body 2 in the third direction D3. The length of the element body 2 in the second direction D2 and the length of the element body 2 in the third direction D3 are equivalent to each other. In the embodiment, the pair of end surfaces 2a, 2b has a square shape, and the pair of first side surfaces 2c, 2d and the pair of second side surfaces 2e, 2f has a rectangular shape. The length of the element body 2 in the first direction D1 may be equivalent to the length of the element body 2 in the second direction D2 and the length of the element body 2 in the third direction D3. The length of the element body 2 in the second direction D2 and the length of the element body 2 in the third direction D3 may be different from each other. The pair of end surfaces 2a, 2b has a rectangular shape.

"Equivalent" does not necessarily mean only that values are exactly equal to each other. Even in a case in which a slight difference within a predetermined range or a manufacturing error is included in the values, the values may be regarded as being equivalent to each other. For example, in a case in which a plurality of values is included within a range of ±5% from an average value of the plurality of values, the plurality of values may be defined to be equivalent to each other.

The pair of first side surfaces 2c, 2d extends in the first direction D1 to couple the pair of end surfaces 2a, 2b. The pair of first side surfaces 2c, 2d extends also in the third direction D3. The pair of second side surfaces 2e, 2f extends in the first direction D1 to couple the pair of end surfaces 2a, 2b. The pair of second side surfaces 2e, 2f extends also in the second direction D2.

The element body 2 is configured by laminating a plurality of dielectric layers in the direction (second direction D2) in which the pair of first side surfaces 2c, 2d oppose each other. In the element body 2, the lamination direction of the plurality of dielectric layers (hereinafter, simply referred to as "lamination direction") coincides with the second direction D2. Each of the dielectric layers is configured by a sintered body of a ceramic green sheet including, for example, a dielectric material (dielectric ceramic such as $BaTiO_3$-based, $Ba(Ti,Zr)O_3$-based, or $(Ba,Ca)TiO_3$-based dielectric ceramic). In the actual element body 2, the dielectric layers are integrated so that the boundary is not visible between the dielectric layers. The third direction D3 may be the lamination direction.

As illustrated in FIGS. 2 and 3, the multilayer capacitor C1 includes a plurality of internal electrodes 11 and a plurality of internal electrodes 13. The internal electrodes 11, 13 include a conductive material (such as Ni or Cu) generally used as an internal conductor of a multilayer electronic component. The internal electrodes 11, 13 are configured as a sintered body of a conductive paste. The conductive paste includes the conductive material. The internal electrodes 11, 13 are internal conductors disposed in the element body 2.

The internal electrodes 11 and the internal electrodes 13 are disposed in different positions (layers) in the second direction D2. The internal electrodes 11 and the internal electrodes 13 are alternately disposed in the element body 2 to oppose each other with intervals in the second direction D2. The internal electrodes 11 and the internal electrodes 13 have polarities different from each other.

As illustrated in FIG. 3, each of the internal electrodes 11 includes a main electrode portion 11a and a connection portion 11b. The connection portion 11b extends from one side (one short side) of the main electrode portion 11a, and is exposed to the end surface 2a. The internal electrodes 11 are exposed to the end surface 2a, and are not exposed to the end surface 2b, the pair of the first side surfaces 2c, 2d, and the pair of the second side surfaces 2e, 2f. The main electrode portion 11a and the connection portion 11b are integrally formed.

The main electrode portion 11a has a rectangular shape in which the first direction D1 is a long-side direction and the third direction D3 is a short-side direction. In the main electrode portion 11a of each internal electrode 11, the length in the first direction D1 is greater than that in the third direction D3. The connection portion 11b extends to the end surface 2a from the end portion of the main electrode portion 11a on the side of the end surface 2a. The length of the connection portion 11b in the first direction D1 is shorter than that of the main electrode portion 11a in the first direction D1. The length of the connection portion 11b in the third direction D3 is equivalent to that of the main electrode portion 11a in the third direction D3. The connection portion 11b is connected to the external electrode 5 at an end portion exposed to the end surface 2a. Each of the internal electrodes 11 includes an end portion exposed to the end surface 2a. The length of the connection portion 11b in the third direction D3 may be shorter than that of the main electrode portion 11a in the third direction D3.

As illustrated in FIG. 3, each of the internal electrodes 13 includes a main electrode portion 13a and a connection portion 13b. The main electrode portion 13a opposes the main electrode portion 11a in the second direction D2 through a part (dielectric layer) of the element body 2. The connection portion 13b extends from one side (one short side) of the main electrode portion 13a, and is exposed to the end surface 2b. The internal electrodes 13 are exposed to the end surface 2b, and are not exposed to the end surface 2a, the pair of the first side surfaces 2c, 2d, and the pair of the second side surfaces 2e, 2f. The main electrode portion 13a and the connection portion 13b are integrally fainted.

The main electrode portion 13a has a rectangular shape in which the first direction D1 is a long-side direction and the third direction D3 is a short-side direction. Regarding the main electrode portion 13a of each internal electrode 13, the length thereof in the first direction D1 is greater than that in the third direction D3. The connection portion 13b extends to the end surface 2b from the end portion of the main electrode portion 13a on the side of the end surface 2b. The length of the connection portion 13b in the first direction D1 is shorter than that of the main electrode portion 13a in the first direction D1. The length of the connection portion 13b in the third direction D3 is equivalent to that of the main electrode portion 13a in the third direction D3. The connection portion 13b is connected to the external electrode 7 at an end portion exposed to the end surface 2b. Each of the internal electrodes 13 includes an end portion exposed to the end surface 2b. The length of the connection portion 13b in the third direction D3 may be shorter than that of the main electrode portion 13a in the third direction D3.

When viewed in the first direction D1, the external electrode 5 is located at the end portion of the element body 2 on the side of the end surface 2a. The external electrode 5 includes an electrode portion 5a disposed on the end surface 2a, and electrode portions 5b disposed on the respective side surfaces 2c, 2d, 2e, 2f. The external electrode 5 is formed on five surfaces 2a, 2c, 2d, 2e, 2f.

The electrode portions 5a, 5b adjacent to each other are connected at ridge portions of the element body 2, and electrically connected. The electrode portion 5a and the electrode portions 5b are connected at the ridge portions between the end surface 2a and respective side surfaces 2c, 2d, 2e, 2f.

The electrode portion 5a entirely covers the end portion of each connection portion 11b exposed to the end surface 2a. The connection portion 11b is directly connected to the external electrode 5. The connection portion 11b connects the main electrode portion 11a and the electrode portion 5a. Each of the internal electrodes 11 is electrically connected to the external electrode 5.

When viewed in the first direction D1, the external electrode 7 is located at the end portion of the element body 2 on the side of the end surface 2b. The external electrode 7 includes an electrode portion 7a disposed on the end surface 2b, and electrode portions 7b disposed on respective side surfaces 2c, 2d, 2e, 2f. The external electrode 7 is formed on five surfaces 2b, 2c, 2d, 2e, 2f.

The electrode portions 7a, 7b adjacent to each other are connected at ridge portions of the element body 2, and electrically connected. The electrode portion 7a and the electrode portions 7b are connected at the ridge portions between the end surface 2b and respective side surfaces 2c, 2d, 2e, 2f.

The electrode portion 7a entirely covers the end portion of each connection portion 13b exposed to the end surface 2b. The connection portion 13b is directly connected to the external electrode 7. The connection portion 13b connects the main electrode portion 13a and the electrode portion 7a. Each of the internal electrodes 13 is electrically connected to the external electrode 7.

As illustrated in FIGS. 4 to 7, the external electrodes 5, 7 include a first electrode layer 21, a second electrode layer 23, a third electrode layer 25, and a fourth electrode layer 27, respectively. The electrode portions 5a, 5b include the first electrode layer 21, the second electrode layer 23, the third electrode layer 25, and the fourth electrode layer 27, respectively. The electrode portions 7a, 7b include the first electrode layer 21, the second electrode layer 23, the third electrode layer 25, and the fourth electrode layer 27, respectively. The fourth electrode layer 27 is an outermost layer of each of the external electrodes 5, 7.

Figure 4:
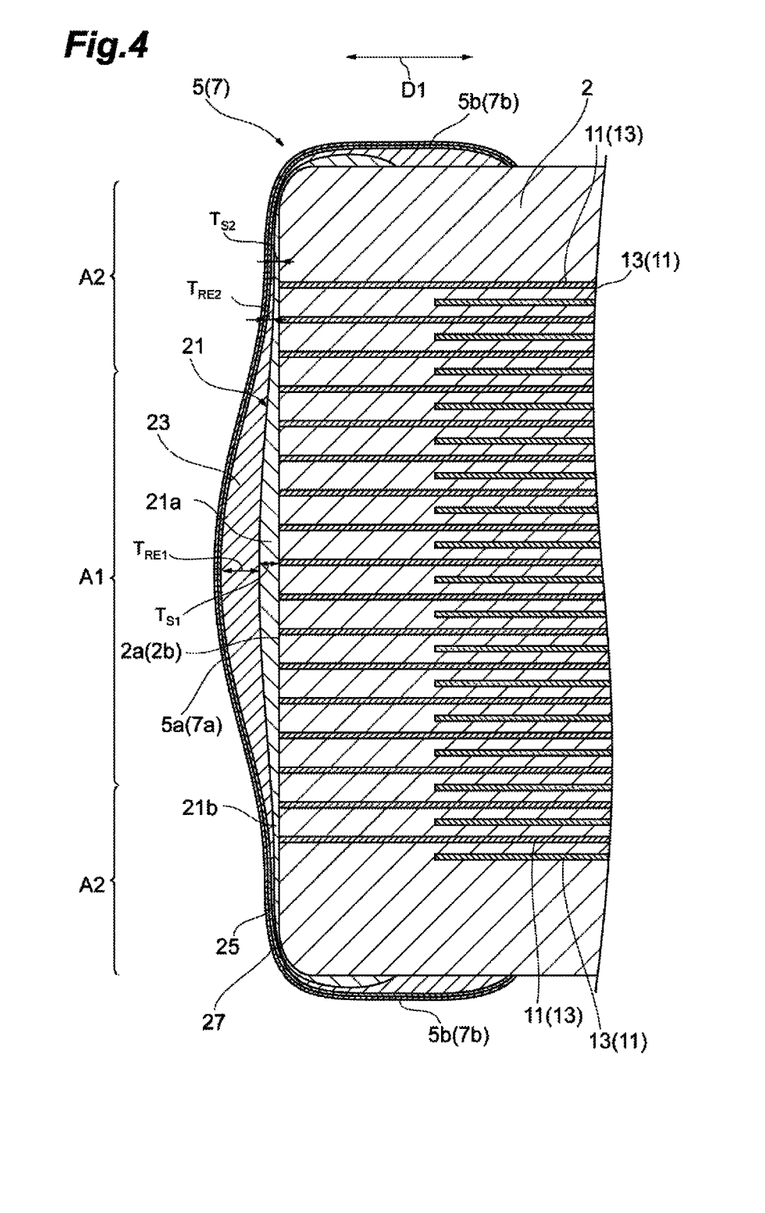
FIG. 4 is a view for explaining a sectional configuration of an external electrode.
Figure 5:
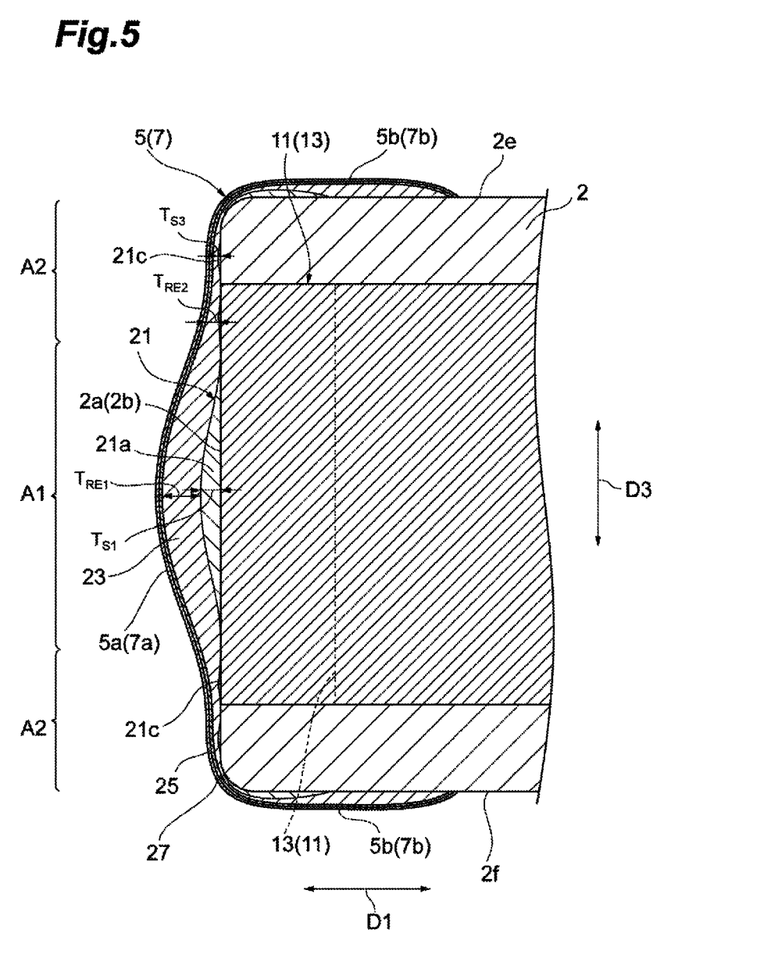
FIG. 5 is a view for explaining a sectional configuration of the external electrode.
Figure 6:
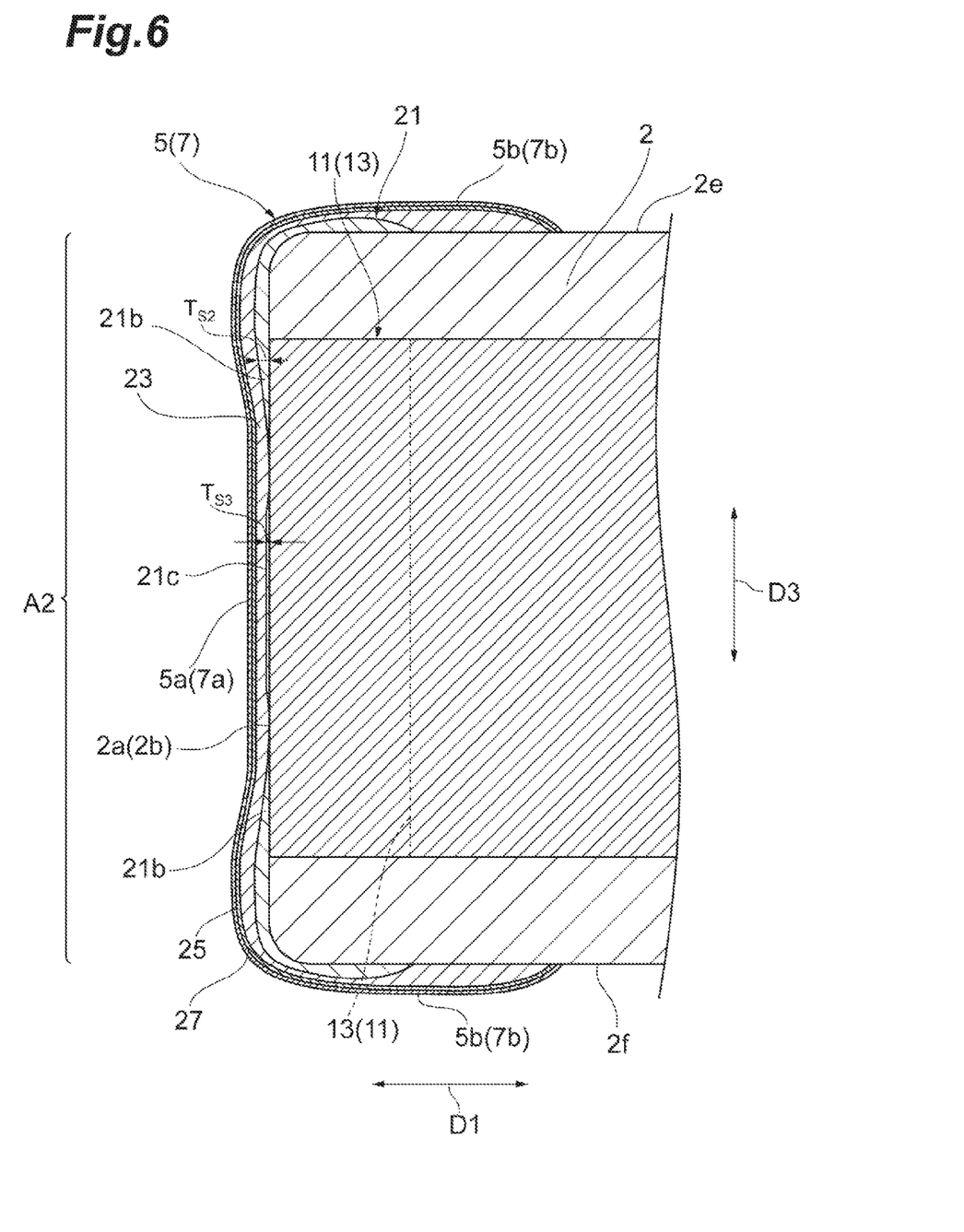
FIG. 6 is a view for explaining a sectional configuration of the external electrode.
Figure 7:
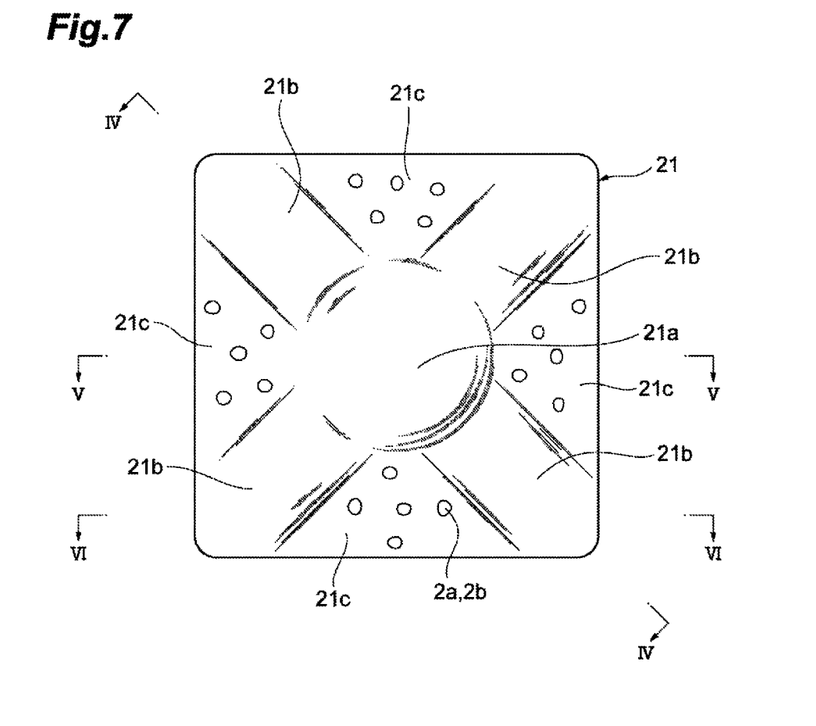
FIG. 7 is a plan view illustrating a first electrode layer.

FIG. 4 illustrates a sectional configuration obtained when cutting the external electrode 5 or 7 with a plane passing through a pair of corner portions diagonally located on the end surface 2a or 2b (plane corresponding to the IV-IV line illustrated in FIG. 7). FIG. 5 illustrates a sectional configuration obtained when cutting the external electrode 5 or 7 with a plane which is in parallel to a pair of side surfaces opposing each other (for example, a pair of first side surfaces 2c, 2d), and located in an equal distance from the pair of side surfaces (plane corresponding to the V-V line illustrated in FIG. 7). FIG. 6 illustrates a sectional configuration obtained when cutting the external electrode 5 or 7 with a plane which is in parallel to a pair of side surfaces opposing each other (for example, a pair of first side surfaces 2c, 2d), and adjacent to one side surface (for example, the first side surface 2d) of the pair of side surfaces (plane corresponding to the VI-VI line illustrated in FIG. 7).

The first electrode layer 21 is formed by sintering a conductive paste applied to the surface of the element body 2. The first electrode layer 21 is a layer formed by sintering a metal component (metal powder) included in the conductive paste. The first electrode layer 21 is a sintered metal layer disposed on the element body 2. In the embodiment, the first electrode layer 21 is a sintered metal layer including Cu. The first electrode layer 21 may be a sintered metal layer including Ni. As described above, the first electrode layer 21 includes base metals (such as Cu or Ni). Powder including base metals, a glass component, an organic binder, and an organic solvent are mixed in the conductive paste.

As illustrated in FIG. 7, the first electrode layer 21 includes a first portion 21a, a second portion 21b, and a third portion 21c. The first portion 21a is disposed in a central region A1 of each of the end surfaces 2a, 2b. The second portion 21b and the third portion 21c are disposed in a peripheral region A2 of each of the end surfaces 2a, 2b. The first portion 21a, the second portion 21b, and the third portion 21c are integrally formed. In the embodiment, the first electrode layer 21 includes four second portions 21b and four third portions 21c.

Each of the second portions 21b is disposed at a part of the peripheral region A2, and extends to an edge portion of each of the end surfaces 2a, 2b from the first portion 21a. Each of the second portions 21b and the end portions of the internal electrodes 11, 13 (connection portions 11b, 13b) at the end surfaces 2a, 2b intersect, viewing from a direction perpendicular to the end surfaces 2a, 2b. In the embodiment, the second portion 21b extends to a corner portion of each of the end surfaces 2a, 2b from the first portion 21a. The four second portions 21b extend radially to corresponding corner portions of each of the end surfaces 2a, 2b from the first portion 21a.

Each of the third portions 21c is disposed in the remaining part of the peripheral region A2. In the embodiment, the third portion 21c is disposed between a pair of second portions 21b adjacent to each other, and couples the pair of second portions 21b. Each of the third portions 21c extends to a side portion of each of the end surfaces 2a, 2b from the first portion 21a. The remaining part of the peripheral region A2 of each of the end surfaces 2a, 2b includes a region exposed from the third portion 21c. The third portion 21c does not cover the remaining part of the peripheral region A2 completely, and the end surfaces 2a, 2b are partially exposed from the third portion 21c.

Figure 8:
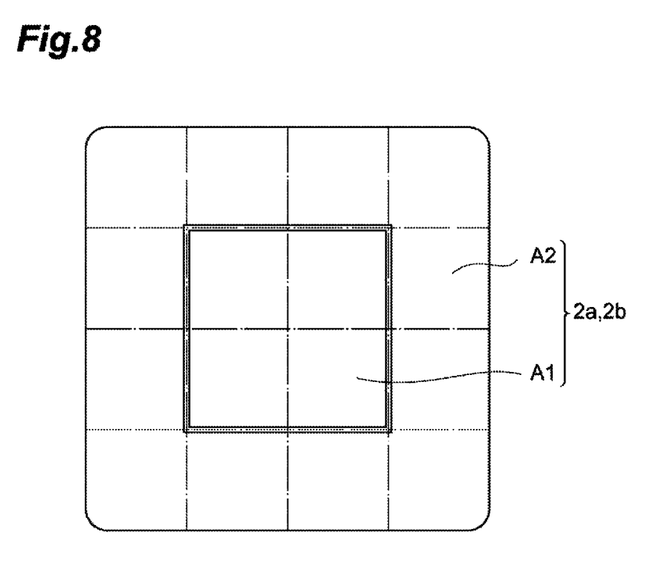
FIG. 8 is a plan view illustrating an end surface.

The central region A1 and the peripheral region A2 of each of the end surfaces 2a, 2b are defined, for example, as follows. As illustrated in FIG. 8, each of the end surfaces 2a, 2b is divided into 16 equal sections. Among the 16 sections, four sections located inside are defined as the central region A1. Among the 16 sections, 12 sections located outside are defined as the peripheral region A2.

As illustrated in FIGS. 4 to 6, a thickness $T_{S1}$ of the first portion 21a is greater than a thickness $T_{S2}$ of the second portion 21b. In other words, the second portion 21b has the thickness $T_{S2}$ which is less than the thickness $T_{S1}$ of the first portion 21a. The thickness $T_{S2}$ of the second portion 21b is greater than a thickness $T_{S3}$ of the third portion 21c. In other words, the third portion 21c has the thickness $T_{S3}$ which is less than the thickness $T_{S2}$ of the second portion 21b.

Here, the thickness means an average thickness. The thickness $T_{S1}$ is an average thickness of the first portion 21a, which is located on the central region A1, of the first electrode layer 21. The thickness $T_{S1}$ is, for example, 10 to 100 µm. The thickness $T_{S2}$ is an average thickness of the second portion 21b, which is located on the peripheral region A2, of the first electrode layer 21. The thickness $T_{S2}$ is, for example, 1 to 10 µm. The thickness $T_{S3}$ is an average thickness of the third portion 21c, which is located on the peripheral region A2, of the first electrode layer 21. The thickness $T_{S3}$ is, for example, greater than zero and less than or equal to 3 µm.

For example, the average thickness can be obtained as follows.

A sectional view is obtained which includes the first portion 21a located on the central region A1 of the first electrode layer 21 and the second portion 21b located on the peripheral region A2 of the first electrode layer 21. This sectional view is, for example, a sectional view of the first electrode layer 21 obtained when cutting the first electrode layer 21 with a plane passing through a pair of corner portions diagonally located on the end surface 2a or 2b in FIG. 7. Areas of the first portion 21a of the first electrode layer 21 and the second portion 21b of the first electrode layer 21 on the obtained sectional view are calculated. The average thickness of the first portion 21a of the first electrode layer 21 is a quotient obtained by dividing the area of the first portion 21a located on the central region A1 of the first electrode layer 21 by the length of the central region A1 on the obtained sectional view. The average thickness of the second portion 21b of the first electrode layer 21 is a quotient obtained by dividing the area of the second portion 21b located on the peripheral region A2 of the first electrode layer 21 by the length of the peripheral region A2 on the obtained sectional view.

A sectional view is obtained which includes the third portion 21c located on the peripheral region A2 of the first electrode layer 21. This sectional view is, for example, a sectional view of the first electrode layer 21 obtained when cutting the first electrode layer 21 with a plane which is in parallel to a pair of side surfaces opposing each other (for example, a pair of the second side surfaces 2e, 2f), and located in an equal distance from the pair of side surfaces in FIG. 7. An area of the third portion 21c of the first electrode layer 21 on the obtained sectional view is calculated. The average thickness of the third portion 21c of the first electrode layer 21 is a quotient obtained by dividing the area of the third portion 21c located on the peripheral region A2 of the first electrode layer 21 by the length of the peripheral region A2 on the obtained sectional view.

A plurality of sectional views may be obtained and each quotient described above may be obtained for each sectional view. In this case, an average value of the obtained quotients may be the average thickness.

The second electrode layer 23 is formed by curing a conductive resin applied onto the first electrode layer 21. The second electrode layer 23 is a conductive resin layer disposed on the first electrode layer 21. The conductive resin is a mixture of a thermosetting resin, metal powder, and an organic solvent. As the metal powder, for example, Ag powder or Cu powder is used. As the thermosetting resin, for example, a phenolic resin, an acrylic resin, a silicone resin, an epoxy resin, or a polyimide resin is used.

The second electrode layer 23 covers the first portion 21a, the second portion 21b, and the third portion 21c. The second electrode layer 23 also covers a region exposed from the third portion 21c in the peripheral region A2. The second electrode layer 23 includes a portion directly formed on the element body 2 (the end surfaces 2a, 2b) in the peripheral region A1. In a case where a part of the connection portions 11b, 13b of the internal electrodes 11, 13 is exposed to the region exposed from the third portion 21c in the peripheral region A2, the part of the connection portions 11b, 13b and the second electrode layer 23 are directly connected.

As illustrated in FIGS. 4 and 5, a thickness $T_{RE1}$ of the second electrode layer 23 located on the central region A1 of each of the end surfaces 2a, 2b is greater than a thickness $T_{RE2}$ of the second electrode layer 23 located on the peripheral region A2 of each of the end surfaces 2a, 2b. As described above, the thickness means an average thickness. The thickness $T_{RE1}$ is an average thickness of the portion, which is located on the central region A1, of the second electrode layer 23. The thickness $T_{RB1}$ is, for example, 10 to 80 μm. The thickness $T_{RE2}$ is an average thickness of the portion, which is located on the peripheral region A2, of the second electrode layer 23. The thickness $T_{RE2}$ is, for example, 1 to 10 μm.

The third electrode layer 25 is formed on the second electrode layer 23 by a plating method. In the embodiment, the third electrode layer 25 is a Ni plating layer disposed on the second electrode layer 23. The third electrode layer 25 may be a Sn plating layer, a Cu plating layer, or an Au plating layer. As described above, the third electrode layer 25 includes Ni, Sn, Cu, or Au.

The fourth electrode layer 27 is formed on the third electrode layer 25 by a plating method. In the embodiment, the fourth electrode layer 27 is a Sn plating layer disposed on the third electrode layer 25. The fourth electrode layer 27 may be a Cu plating layer, or an Au plating layer. As described above, the fourth electrode layer 27 includes Sn, Cu, or Au. The third and fourth electrode layers 25, 27 are plating layers formed on the second electrode layer 23.

The multilayer capacitor C1 is mounted by soldering to another electronic device (e.g., a circuit board, an electronic component, or the like). In the multilayer capacitor C1, one of the four side surfaces 2c, 2d, 2e, 2f is a mounting surface opposing the other electronic device.

A solder fillet is formed on each of the external electrodes 5, 7 through solidification of molten solder. Stress is generated in the solder fillet when the molten solder is solidified. In the multilayer capacitor C1, the external electrodes 5, 7 each include the second electrode layer 23, and therefore the stress by the solder fillet is relaxed by the conductive resin layer.

The stress by the solder fillet more strongly acts on a central electrode portion of each of the electrode portions 5a, 7a corresponding to the central region A1, than on a peripheral electrode portion of each of the external electrodes 5, 7 (electrode portions 5a, 7a) corresponding to the peripheral region A2. In other words, the stress acting on the central electrode portion of each of the electrode portions 5a, 7a is greater than the stress acting on the peripheral electrode portion of each of the electrode portions 5a, 7a. In the multilayer capacitor C1, the thickness $T_{S1}$ of the first portion 21a is greater than the thickness $T_{S2}$ of the second portion 21b, and the thickness $T_{S1}$ of the first portion 21a is greater than the thickness $T_{S3}$ of the third portion 21c. As a result, fixing strength between the element body 2 and the first electrode layer 21 is improved in the multilayer capacitor C1, in comparison with, for example, a multilayer capacitor in which the thickness of the first electrode layer 21 is the thickness $T_{S2}$ or the thickness $T_{S3}$ throughout the first electrode layer 21. Therefore, the fixing strength between the element body 2 and each of the external electrodes 5, 7 is improved.

In the multilayer capacitor C1, the second portion 21b extends to an edge portion of each of the end surfaces 2a, 2b from the first portion 21a. Therefore, connectability between the end portions of the internal electrodes 11, 13 (connection portions 11b, 13b) and the second portion 21b is secured. The thickness $T_{S2}$ of the second portion 21b is greater than the thickness $T_{S3}$ of the third portion 21c. Consequently, the connectability between the end portions of the internal electrodes 11, 13 and the second portion 21b is further secured in the multilayer capacitor C1, in comparison with, for example, a multilayer capacitor in which the thickness $T_{S2}$ is less than or equal to the thickness $T_{S3}$. As a result, electrical connection between the internal electrodes 11, 13 and the first electrode layer 21 is securely maintained.

When the first electrode layer 21 is formed on the element body 2, stress may be generated in the element body 2. The stress generated in the element body 2 increases as the thickness of the first electrode layer 21 increases. In the multilayer capacitor C1, the thickness $T_{S3}$ of the third portion 21c is less than the thickness $T_{S2}$ of the second portion 21b. As a result, the stress by the first electrode layer 21 is relaxed in the multilayer capacitor C1, in comparison with, for example, a multilayer capacitor in which the thickness $T_{S3}$ is greater than or equal to the thickness $T_{S2}$.

The remaining part of the peripheral region A2 of each of the end surfaces 2a, 2b includes the region exposed from the third portion 21c. The second electrode layer 23 also covers a region exposed from the third portion 21c in the peripheral region A2. As a result, the stress by the second electrode layer 23 is further relaxed. Since the first electrode layer 21 includes the first portion 21a and the second portion 21b, the electrical connection between the internal electrodes 11, 13 and the first electrode layer 21 is maintained even when the remaining part of the peripheral region A2 of each of the end surfaces 2a, 2b includes the region exposed from the third portion 21c, in other words, a region where the third portion 21c is not formed.

The second portion 21b and the end portions (end portions exposed to the end surfaces 2a, 2b) of the internal electrodes 11, 13 (connection portions 11b, 13b) intersect, viewing from a direction perpendicular to the end surfaces 2a, 2b. As a result, even when the numbers of the internal electrodes 11 and 13 are each more than one, connectability between the end portions of all the internal electrodes 11 and 13 and the second portion 21b is secured.

The second portion 21b extends to a corner portion of each of the end surfaces 2a, 2b. As a result, even when the numbers of the internal electrodes 11 and 13 are each more than one, connectability between the end portions of all the internal electrodes 11 and 13 and the second portion 21b is secured.

The thickness $T_{RE1}$ of the second electrode layer 23 is greater than the thickness $T_{RE2}$ of the second electrode layer 23. As a result, the stress by the solder fillet is sufficiently relaxed.

The stress acting on the peripheral electrode portion of each of the external electrodes 5, 7 (electrode portions 5a, 7a) is less than the stress acting on the central electrode portion of each of the external electrodes 5, 7. Therefore, it is possible to make the thickness $T_{RE2}$ of the second electrode layer 23 less than the thickness $T_{RE1}$ of the second electrode layer 23 in a manner corresponding to the peripheral electrode portion of each of the external electrodes 5, 7 of which the stress acting thereon is less than that of the central electrode portion of each of the external electrodes 5, 7. In that case, the thickness $T_{RE2}$ of the second electrode layer 23 is less than the thickness $T_{RE1}$ of the second electrode layer 23, and thus an amount of the conductive resin used can be reduced accordingly.

As described above, the thickness $T_{RE2}$ is less than the thickness $T_{RE1}$ in the multilayer capacitor C1. As a result, the amount of the conductive resin used can be reduced in the multilayer capacitor C1, in comparison with, for example, a multilayer capacitor in which the thickness of the second electrode layer 23 is the thickness $T_{RE1}$ throughout the second electrode layer 23.

The external electrodes 5, 7 each include the third and fourth electrode layers 25, 27 disposed on the second electrode layer 23. Therefore, the multilayer capacitor C1 is securely mounted by soldering on an electronic device.

The embodiment of the present invention has been described above. However, the present invention is not necessarily limited to the above-described embodiment, and may be variously changed without departing from the scope of the present invention.

Figure 9:
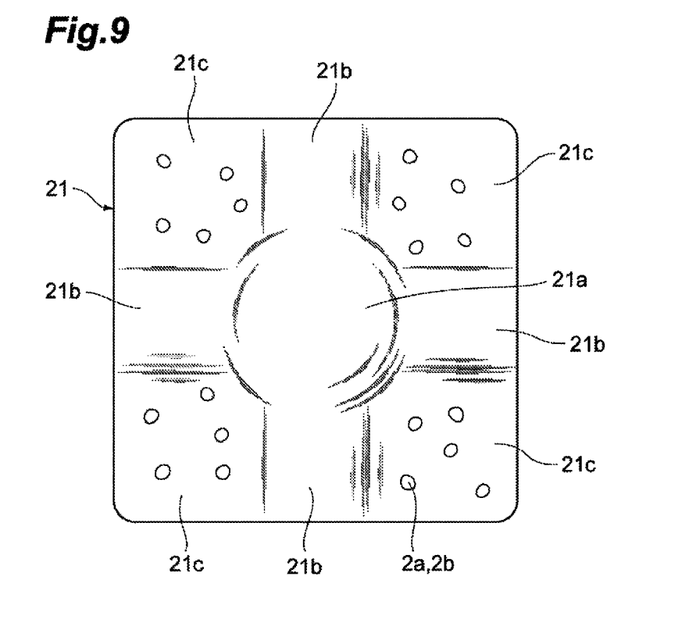
FIG. 9 is a plan view illustrating a first electrode layer according to a variation.

As illustrated in FIG. 9, each of the second portions 21b may extend to a side portion of each of the end surfaces 2a, 2b from the first portion 21a. In this case, the second portion 21b extends to the second direction D2 or the third direction D3. The number of the second portions 21b is not limited to the above-described number, i.e. four. The number of the second portions 21b may be two or three, or five or more.

The external electrodes 5, 7 each include the third and fourth electrode layers 25, 27 as a plating layer. In other words, the number of the plating layers included in each of the external electrodes 5, 7 is more than one. However, there is no limitation thereto. The number of the plating layers included in each of the external electrodes 5, 7 may be one.

The external electrode 5 is formed on five surfaces 2a, 2c, 2d, 2e, 2f, and the external electrode 7 is formed on five surfaces 2b, 2c, 2d, 2e, 2f. However, there is no limitation thereto. The external electrode 5 may be formed on two surfaces of the end surface 2a and one side surface as a mounting surface, or may be formed on the end surface 2a only The external electrode 7 may be formed on two surfaces of the end surface 2b and one side surface as a mounting surface, or may be formed on the end surface 2b only.

In the embodiment and the variations, descriptions have been given using the multilayer capacitor C1 as an example of the electronic component. However, the application of the present invention is not limited to a multilayer capacitor. The present invention can be applied to a multilayer electronic component such as a multilayer inductor, a multilayer varistor, a multilayer piezoelectric actuator, a multilayer thermistor, or a multilayer composite component, or an electronic component other than the multilayer electronic component.

What is claimed is:

1. An electronic component comprising:
   an element body having a pair of end surfaces opposing each other;
   an external electrode disposed on at least the end surface; and
   an internal conductor disposed in the element body and connected to the external electrode, wherein
   the internal conductor includes an end portion exposed to the end surface,
   the external electrode includes a sintered metal layer disposed on at least the end surface and a conductive resin layer disposed on the sintered metal layer,
   the sintered metal layer includes:
   a first portion disposed at a central region of the end surface;
   a second portion disposed at a part of a peripheral region of the end surface, and extending to an edge portion of the end surface from the first portion; and
   a third portion disposed at a remaining part of the peripheral region of the end surface,
   a thickness of the second portion is less than that of the first portion, and a thickness of the third portion is less than that of the second portion, and
   the first portion, the second portion, and the third portion are covered with the conductive resin layer.

2. The electronic component according to claim 1, wherein
   the remaining part of the peripheral region of the end surface includes a region exposed from the third portion, and
   the region exposed from the third portion is covered with the conductive resin layer.

3. The electronic component according to claim 1, wherein
   the second portion and the end portion of the internal conductor intersect, viewing from a direction perpendicular to the end surface.

4. The electronic component according to claim 1, wherein
   the end surface has a rectangular shape, and
   the second portion extends to a corner portion of the end surface.

5. The electronic component according to claim 1, wherein
   a thickness of the conductive resin layer located on the central region of the end surface is greater than a thickness of the conductive resin layer located on the peripheral region of the end surface.

6. The electronic component according to claim 1, wherein
   the external electrode further includes a plating layer disposed on the conductive resin layer.

* * * * *